US010601868B2

(12) United States Patent
 Wilcox

(10) Patent No.: US 10,601,868 B2
(45) Date of Patent: Mar. 24, 2020

(54) ENHANCED TECHNIQUES FOR GENERATING AND DEPLOYING DYNAMIC FALSE USER ACCOUNTS

(71) Applicant: MICROSOFT TECHNOLOGY LICENSING, LLC, Redmond, WA (US)

(72) Inventor: Brian Michael Wilcox, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 16/100,154

(22) Filed: Aug. 9, 2018

(65) Prior Publication Data
US 2020/0053121 A1  Feb. 13, 2020

(51) Int. Cl.
G06F 17/27 (2006.01)
H04L 29/06 (2006.01)
G06N 3/08 (2006.01)

(52) U.S. Cl.
CPC ...... *H04L 63/1491* (2013.01); *G06F 17/2705* (2013.01); *G06F 17/2775* (2013.01); *G06F 17/2785* (2013.01); *G06N 3/08* (2013.01); *H04L 63/1483* (2013.01)

(58) Field of Classification Search
CPC combination set(s) only.
See application file for complete search history.

(56) References Cited

U.S. PATENT DOCUMENTS

| 7,558,832 B2 | 7/2009 | Rounthwaite et al. |
| 8,181,250 B2 | 5/2012 | Rafalovich et al. |
| 9,311,476 B2 | 4/2016 | Stolfo et al. |
| 9,560,075 B2 | 1/2017 | Goldberg et al. |
| 9,813,450 B1 * | 11/2017 | Wasiq ............ H04L 63/20 |

(Continued)

FOREIGN PATENT DOCUMENTS

| EP | 1382154 A1 | 1/2004 |
| EP | 2611106 A1 | 7/2013 |

(Continued)

OTHER PUBLICATIONS

US 9,985,987 B1, 05/2018, Allen (withdrawn)
"BOTsink: Network-based Threat Deception for Post-Compromise Threat Detection", Retrieved from: https://attivonetworks.com/product/attivo-botsink/, Retrieved on: Jun. 18, 2018, 19 Pages.
"Office 365 helps secure Microsoft from modern phishing campaigns", In Technical White Paper of Microsoft, Apr. 10, 2018, 15 Pages.

(Continued)

*Primary Examiner* — Abul K Azad
(74) *Attorney, Agent, or Firm* — Newport IP, LLC; Mike R. Cicero

(57) ABSTRACT

Technologies described herein facilitate generating and deploying dynamic false user accounts. Embodiments disclosed herein obtain a false tenant model that is usable to dynamically populate a false user account with messages and/or data files. Rather than containing only a static set of documents, a "dynamic" false user account is continually populated with fresh documents. This results in dynamic false user accounts appearing practically indistinguishable from real user accounts that are continually populated with new real email messages and/or new real hosted files as they are used by account owners to perform legitimate business activities. The realistic nature of the dynamic false user accounts described herein significantly reduces the ability of malicious entities to identify a user account as being false in nature.

20 Claims, 7 Drawing Sheets

(56) References Cited

U.S. PATENT DOCUMENTS

| | | |
|---|---|---|
| 2004/0215977 A1 | 10/2004 | Goodman et al. |
| 2007/0192853 A1 | 8/2007 | Shraim et al. |
| 2013/0262242 A1* | 10/2013 | Tateo .............. G06Q 30/0276 |
| | | 705/14.72 |
| 2014/0041024 A1 | 2/2014 | Larkins |
| 2014/0282872 A1* | 9/2014 | Hansen .............. H04L 63/102 |
| | | 726/3 |
| 2015/0277681 A1* | 10/2015 | Isaacson .............. G06F 3/0484 |
| | | 705/26.8 |
| 2016/0005050 A1* | 1/2016 | Teman .............. G06F 16/583 |
| | | 705/317 |
| 2017/0134423 A1 | 5/2017 | Sysman et al. |
| 2017/0310705 A1 | 10/2017 | Gopalakrishna et al. |
| 2017/0331858 A1 | 11/2017 | Clark et al. |
| 2018/0007066 A1 | 1/2018 | Goutal |

FOREIGN PATENT DOCUMENTS

| | | |
|---|---|---|
| EP | 2942919 A1 | 11/2015 |
| KR | 20050073702 A | 7/2005 |
| WO | 2006131124 A1 | 12/2006 |
| WO | 2017145001 A1 | 8/2017 |

OTHER PUBLICATIONS

Costarella, et al., "Hardening Honeynets against Honeypot-Aware Botnet Attacks", In Proceedings of International Conference on Information Security and Cryptology, Dec. 14, 2008, pp. 1-35.

Li, et al., "A novel anti-phishing framework based on honeypots", In Proceedings of eCrime Researchers Summit, Sep. 20, 2009, 19 Pages.

Long, Du, "Deception and Sandboxing", Retrieved from: https://securingtomorrow.mcafee.com/business/deception-and-sandboxing/, Oct. 20, 2016, 4 Pages.

Scherman, et al., "Automatic Malicious Session Detection", Application as Filed in U.S. Appl. No. 15/908,661, filed Feb. 28, 2018, 29 Pages.

"International Search Report and Written Opinion Issued in PCT Application No. PCT/US19/038824", dated Sep. 24, 2019, 10 Pages.

"International Search Report and Written Opinion Issued in PCT Application No. PCT/US19/038830", dated Sep. 20, 2019, 11 Pages.

\* cited by examiner

ENHANCED TECHNIQUES FOR GENERATING AND DEPLOYING DYNAMIC FALSE USER ACCOUNTS

BACKGROUND

A variety of computer security mechanisms exist for deploying false computing resources that mimic legitimate "user-owned" computing resources in order to attract malicious computing activities. For example, in addition to a set of legitimate user-owned email accounts that are used in performing core business activities, an organization may also deploy a set of false email accounts that generally appear to be legitimate, but which are void of sensitive business information. The organization may then "seed" various resources with credentials for logging into these false email accounts to entice malicious entities (e.g., hackers, phishing campaigners, industrial spies, etc.) to spend time and resources perusing through the false email accounts. In this way, the malicious entities may be deceived into divulging certain types of information that is useful in identifying and preventing future attacks on the organization's legitimate computing resources. Moreover, any amount of time that a malicious entity is deceived into spending logged into the false computing resources is essentially wasted time that the malicious entity was unable to spend attacking legitimate computing resources.

Modern false computing resources are unfortunately easy to detect by malicious entities. For example, a modern false email account or file-hosting account will contain only a static set of documents (e.g., emails, hosted files, etc.). Moreover, a modern false email account does not respond to messages or otherwise interact with malicious entities. Upon identifying a specific computing resource is being a false computing resource, malicious entities immediately log off and do not return. If a malicious entity quickly recognizes the false nature of a computing resource, an organization may expend significantly more resources setting up the false computing resources than is consumed from the malicious entity.

It is with respect to these and other considerations that the disclosure made herein is presented.

SUMMARY

Technologies described herein facilitate generating and deploying dynamic false user accounts. Generally described, embodiments disclosed herein obtain a false tenant model that is usable to dynamically populate a false user account with messages and/or data files. Thus, rather than containing only a static set of documents, a "dynamic" false user account is continually populated with fresh documents (e.g., emails, hosted files, etc.). This results in dynamic false user accounts appearing practically indistinguishable from real user accounts that are continually populated with new real email messages and/or new real hosted files as they are used by account owners to perform legitimate business activities. The realistic nature of the dynamic false user accounts described herein significantly reduces the ability of malicious entities to identify a user account as being false in nature. Thus, as compared to conventional false user accounts that are static in nature, the dynamic false user accounts described herein are better suited for enticing malicious entities to remain logged in—thereby prolonging the period of time during which the malicious entities' behavior can be observed and the amount of the malicious entities' time that is wasted.

Implementations of the techniques described herein improve computing security with respect to sensitive organizational resources. For example, various implementations are designed to isolate malicious code (e.g., malicious user interface (UI) controls) from reaching real user accounts and real user devices for the specific technical purpose of preventing vulnerable computing resources (e.g., user accounts and user devices) from being compromised. With respect to this point, it can be appreciated that in many cases phishing emails and/or other malicious communications contain viruses (e.g., ransomware). Therefore, as compared to conventional "static" false user accounts, implementing dynamic false user accounts that are practically indistinguishable from real user accounts entice a significantly larger amount of interaction from malicious entities'. It can be appreciated that this larger amount of interaction facilities harvesting additional information about attack strategies and malware that are used by the malicious entities—thereby thwarting future use of such attack strategies and malware.

Furthermore, it will be appreciated that by quarantining communications from known malicious entities so that they don't reach real user accounts, the described techniques are specifically directed towards performing isolation and eradication of computer viruses, worms, and other malicious code from vulnerable computing resources (e.g., user accounts, user devices, etc.). This mitigates security risks that are posed by communications from known malicious entities (e.g., malicious phishing email scams) and, in turn, significantly reduces the computing resources and human resources that are required to regain security of compromised user devices and/or user accounts. To illustrate this point, consider that once a phisher gains access to a specific real user account it is common for the phisher to immediately change the user credentials associated with this specific real user account to essentially lock-out the real and rightful owner of the account. Then, significant computing resources are typically allotted to sophisticated security systems in order to regain control over the real user account. Since the dynamic nature of the novel false user accounts described herein deceives malicious entities into divulging significant details regarding their attack strategies and malicious code (s), the techniques described herein significantly improve an organization's ability to prevent real computing resources from being compromised.

In some implementations, a system receives a corpus of text that includes a set of data files which exhibit certain properties. As an example, the system may receive the corpus of text in the form of selections of one or more components of real user accounts such as, for example, real email accounts and/or real file-hosting accounts. Additionally, or alternatively, the system may receive the corpus of text in the form of business documents that generally relate to a particular industry (e.g., banking, software, etc.) and/or technological space (e.g., software, vehicle autonomation, etc.). The system may analyze the corpus of text to identify the properties exhibited by the set of data files so that false data files can be generated that exhibit the same and/or similar properties but that lack real sensitive information that a malicious entity might be seeking.

In some implementations, the corpus of text may be provided to a corpus analysis application which may utilize various artificial intelligence (AI) techniques to identify the properties that are exhibited by the set of data files. As a specific example, the corpus analysis application may utilize a recurrent neural network (RNN) that includes multiple layers of Long Short-Term Memory (LSTM) units to analyze the corpus of text and to determine the various properties. Regarding the properties of the corpus of text that may be determined, the corpus analysis application may determine the vocabulary and/or grammatical structure that is used within the corpus of text. The vocabulary may include a listing of the individual words found in the corpus and their corresponding frequency of use. The grammatical structure may be an underlying structure or theme with which the various individual words of the vocabulary are compiled together in the corpus of text in order to communicate concepts and/or information.

Based on the properties of the corpus of text, the system may generate a false tenant model that is usable to generate other data files that are false in nature and that exhibit the properties of the analyzed corpus of text. For example, if the corpus of text includes a plurality of emails obtained from one or more real inboxes and/or real outboxes, then the false tenant model may be usable to generate other individual emails that exhibit similar properties as was observed in association one or more real inboxes and/or real outboxes. However, despite appearing similar to the analyzed set of "real" data files, the data files that are generated by the false tenant model are fanciful data files and therefore have no real value to a malicious entity who gains access thereto. For example, the generated files may appear to be genuine email documents despite being generated by a computing system rather than by an actual person. The realistic nature of the generated file deceives a malicious entity that views the generated files into believing that the generated fake data files are actually are real data files containing potentially valuable information.

Upon being generated, the system may deploy the false tenant model to populate a false user account with a set of false data files that appear real and legitimate but that are of no real value. For example, the false user account may be an email account that appears to be a real email account and may even be usable to send and/or receive emails. However, the false user account is not actually assigned to a real user but rather is designed to attract malicious entities to observe their computing habits, waste their time, and/or extract additional detail regarding new and/or evolving phishing campaigns. It can be appreciated that in some cases such a false user account may be colloquially referred to in various industries and/or contexts as a "honeypot" type user account.

The system may receive a request for access to the false user account from a computing device that is being operated by a malicious entity. For purposes of the present discussion, such a computing device may be referred to herein as a phisher device. The phisher device may be a laptop computer or some other type of personal computing device. In some implementations, the request may include credentials associated with the false user account. As described herein, the credentials may be transmitted in a seed response to lure the malicious entity (e.g., a malicious phisher and/or industrial spy) into accessing the false user account that is being and/or has been populated with data files generated via the false tenant model.

Then, the system may respond to the request by provisioning the phisher device with access to false user account and the data file therein which have been generated by the false tenant model. In this way, the malicious entity is enabled to log into the false user account which in turn provides the malicious entity with the false impression that access has been obtained to a real user account that is being used to conduct actual business. In some embodiments, the false tenant model may be used to periodically generate and add new files into the false user account. In this way, the malicious entity can be logged into the false user account and, in real time, be witnesses emails being sent and/or received to give the impression that a real user is concurrently logged into and even using the false user account. The realistic nature of the dynamic false user accounts described herein significantly reduce the ability of malicious entities to identify a user account as being false in nature.

In some implementations, the credentials included within the request may include a combination of a real alias (e.g., an email alias that is assigned to a real user account) and a deception trap password that provisions access to the false user account in lieu of the real user account. Logging into the false user account with the deception trap password may provision access to the false user account in a matter that gives the impression of being logged into the real user account. For example, if a real user account corresponds a real user alias of steve@enterprisedomain.com, then providing a deception trap password along with the steve@enterprisedomain.com alias may provision access to the false user account in a manner that deceives the malicious entity into thinking they are logged into the real user account as steve@enterprisedomain.com.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes techniques for generating and deploying dynamic false user accounts. In various implementations, false user accounts are populated with sets of false data files that are generated to exhibit properties which are similar to a set of previously analyzed real data files. In this way, the false data files are modeled after (e.g., mimic) the real data files but are void of sensitive real information that could be exploited by a malicious entity (e.g., a phisher, an industrial sky, etc.) if obtained.

Generally described, various embodiments obtain a false tenant model that is usable to dynamically populate a false user account with messages and/or data files. Thus, rather than containing only a static set of documents, a "dynamic" false user account is continually populated with fresh documents (e.g., emails, hosted files, etc.). This results in dynamic false user accounts appearing practically indistinguishable from real user accounts that are continually populated with new real email messages and/or new real hosted files as they are used by account owners to perform legitimate business activities.

The realistic nature of the dynamic false user accounts described herein significantly reduces the ability of malicious entities to identify a user account as being false in nature. Thus, as compared to conventional false user accounts that are static in nature, the dynamic false user accounts described herein are better suited for enticing malicious entities to remain logged in—thereby prolonging the period of time during which the malicious entities' behavior can be observed and the amount of the malicious entities' time that is wasted.

Implementations of the techniques described herein improve computing security with respect to sensitive organizational resources. For example, various implementations are designed to isolate malicious code (e.g., malicious user interface (UI) controls) from reaching real user accounts and real user devices for the specific technical purpose of preventing vulnerable computing resources (e.g., user accounts and user devices) from being compromised. With respect to this point, it can be appreciated that in many cases phishing emails and/or other malicious communications contain viruses (e.g., ransomware). Therefore, as compared to conventional "static" false user accounts, implementing dynamic false user accounts that are practically indistinguishable from real user accounts entice a significantly larger amount of interaction from malicious entities'. It can be appreciated that this larger amount of interaction facilitates harvesting additional information about attack strategies and malware that are used by the malicious entities—thereby thwarting future user of such attack strategies and malware.

Figure 1:
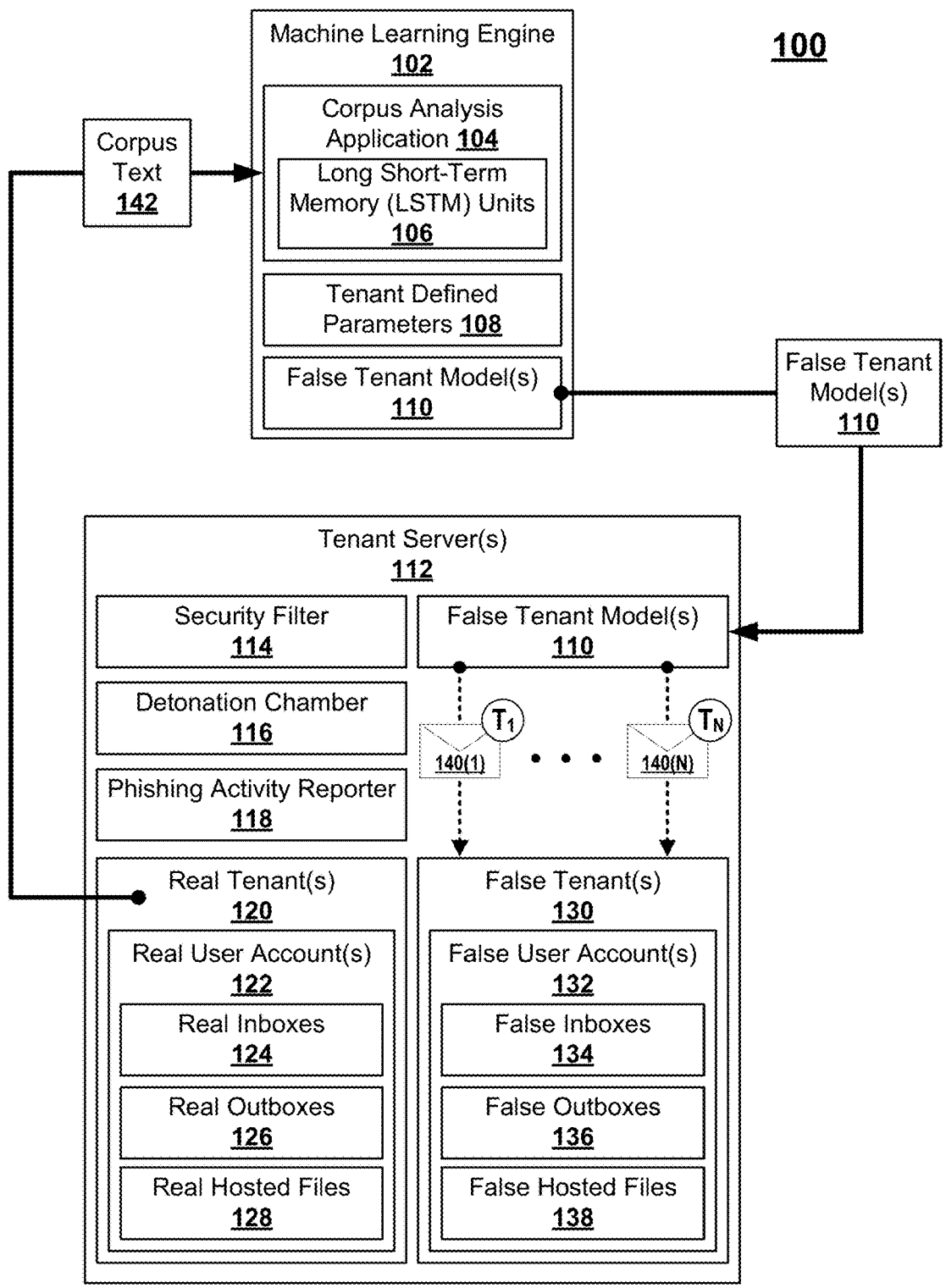
FIG. 1 is a schematic diagram of an illustrative computing environment that is configured to deploy a machine learning engine to analyze a corpus of text to generate false tenant model that is usable to populate a false tenant with messages and/or data files.

Turning now to FIG. 1, illustrated is a system 100 for deploying a machine learning engine 102 to analyze a corpus of text 142 to generate a false tenant model 110 that is usable for populating a false tenant 130 with false data files 140 such as, for example, false emails, false word processing documents, and so on. In the illustrated implementations, the false tenant model 110 is used to periodically generate new email messages and add these newly generated email messages to a false "email" inbox 134 of the false user account 132. In this way, when a malicious entity logs into the false user account 132 (e.g., using credential obtained in a seed response as described elsewhere herein) it will appear as if the false user account 132 is actually being used at that time. For example, from the perspective of the malicious entity, new email message type false data files 140 will be periodically received in the false inbox 134 and/or false outbox 136—thereby making it appear as if a real user is actually signed into and conducting business from the false user account 132.

As illustrated, the system 100 may include one or more tenant servers 112 that are designed to implement one or more real tenants 120. Individual ones of these real tenants 120 may correspond to individual enterprises (e.g., businesses, government organizations, education organizations, etc.) and may include one or more real user accounts 122. For example, a particular business may purchase a subscription to a real tenant 120 (e.g., an OFFICE 365 tenant offered by MICROSOFT, a G SUITE tenant offered by GOOGLE, etc.) and a tenant administrator within the particular business may initiate (set-up) and manage the real user accounts 122 for individual employees of the particular business.

Individual users (e.g., employees) may be assigned real user credentials that enable the individual users to access their real user accounts 122 via one or more user devices. As a specific but nonlimiting example, the real user credentials may include an email alias (e.g., steve@enterprisedomain.com) and a real user password. The individual users may log into their real user account 122 by entering these credentials via a specific webpage that is associated with the tenant servers 112. Upon successfully logging into their corresponding real user account 122, the users may be provided with access to a variety of resources such as, for example, an email account (e.g., a GMAIL and/or OUTLOOK account) and/or a file hosting account (e.g., GOOGLE DRIVE and/or OUTLOOK).

As further illustrated, the tenant servers 112 may include a security filter 114 to analyze messages and to filter out phishing messages that are designed to fraudulently deceive users into providing various types of sensitive information. For example, as illustrated, a message 410 is transmitted from a phisher computer system 402 to the tenant servers 112 where it is received by the security filter 114. In order to safely handle fishing messages, the tenant servers 112 may implement a detonation chamber 116 that is designed to facilitate manipulation of various aspects of individual messages in a protected environment. For example, the detonation chamber 116 may be an isolated computing environment such as, for example, a container and/or light weight virtual machine that isolates the real tenants 120 and real user accounts 122 thereof from any computing activity that occurs within the detonation chamber 116. These aspects will be described in more detail below with respect to FIGS. 4 and 5.

In the illustrated example, a false tenant model 110 is created by a machine learning engine 102 and is then provided to the tenant servers 112 for continual deployment. The false tenant model 110 may be created by receiving a corpus of text 142 from one or more real tenants 120. The corpus of text 142 may be a selected portion of data that is saved in association with one or more real user accounts 122. As illustrated, the real user accounts 122 may include one or more of real inboxes 124, real outboxes 126, and/or real hosted files 128. The real inboxes 124 may correspond to storage locations in which incoming emails that are addressed to particular email aliases are stored. The real outboxes 126 may correspond to storage locations in which copies of outgoing mail that is sent from the particular email aliases are stored. The real hosted files 128 may correspond to storage locations in which account owners corresponding to the real user accounts 122 are enabled to store data files such as, for example, text documents, spreadsheets, slide presentations, and so on. It can be appreciated that individual real user accounts 122 may each have an individual corresponding real inbox 124, real outbox 126, and set of real hosted files 128.

As used herein, when used in the context of an adjective modifying a noun, the term "false" generally refers to the denoted item (e.g., user account, response, credit card number, user credential, etc.) appearing to be a genuine instance of the denoted item that is deliberately made to deceive an entity. For example, a user account that is created and populated with items (e.g., emails, data files, etc.) that are generated by a machine learning model (e.g., a false tenant model) rather than by a human user for the purpose of deceiving a phishing entity, may aptly be referred to herein as a false user account. As another example, a response that is generated by a response engine as described herein and then transmitted to a phishing entity to dilute and/or pollute response data may aptly be described as a false response. As used herein, when used in the context of an adjective modifying a noun, the term "real" generally refers to the denoted item being a genuine instance of the denoted item. For example, a user account that is actually assigned to and utilized by a human employee of an organization may aptly be described as a real user account.

In some embodiments, the corpus of text 142 may include one or more real inboxes 124, real outboxes 126, and/or sets of real hosted files 128. For example, an administrator of a real tenant 120 may select a set of individual real user accounts 122 that are to be used as the corpus of text 142. Stated alternatively, the set of data files that make up the corpus of text 142 may be real data files that are harvested from one or more selected real user accounts 122.

In some implementations, one or more false tenants 130 may individually correspond to one or more real tenants 120 and the false tenant model(s) 110 that are used to populate the false tenant(s) 130 may generated based on "real" data files that are provided by the one or more real tenants 120. In this way, the messages and/or data files that are ultimately generated to populate the false user accounts 132 of a particular false tenant 130 may actually stem from a corpus of text 142 that is obtained from real user accounts 122 of the particular real tenant 120 to which the false tenant 130 corresponds. For example, a particular enterprise that subscribes to a real tenant 120 may provide access to one or more of its real user accounts 122 to be used as the corpus of text 142. It can be appreciated that in such embodiments the actual messages and/or data files that are generated by the false tenant model 110 that is generated based on the corpus of text 142 provided by a particular real tenant 120 may appear to the phisher 326 as genuine business data.

As illustrated, the corpus of text 142 may be provided to the machine learning engine 102 and, more particularly, to a corpus analysis application 104 that is implemented by the machine learning engine 102. When deployed by the machine learning engine 102 to analyze the corpus of text 142, the corpus analysis application 104 may utilize one or more machine learning techniques to determine various properties of the corpus of text 142. As a specific but non-limiting example, the corpus analysis application 104 may utilize a recurrent neural network (RNN) to determine various properties of the corpus of text 142. An exemplary RNN may include a plurality of layers of Long Short-Term Memory (LSTM) units 106 to analyze the corpus of text 142 and determine the various properties.

Regarding the properties of the corpus of text 142 that may be determined, the corpus analysis application 104 may determine the vocabulary and/or grammatical structure that is used within the corpus of text 142. The vocabulary may include a listing of the individual words found in the corpus of text 142 and their corresponding frequency of use within the corpus of text 142. The grammatical structure may be an underlying structure or theme with which the various individual words of the vocabulary are compiled together in the corpus of text 142 in order to communicate concepts and/or information.

Based on the properties that are determined for the corpus of text 142, the corpus analysis application 104 may generate a false tenant model 110 that is usable to generate new false data files 140 that are structurally similar to those included within the corpus of text 142—but which are fanciful and of no actual value to any malicious entity obtaining access thereto. In some embodiments, these generated false data files 140 are generated and/or added to the false user accounts 132 periodically over time. For example, as illustrated, a first false data file 140(1) is transmitted to the false user accounts 132 at a first time $T_1$ whereas a $N^{th}$ false data file 140(N) is transmitted to the false user account 132 at an $N^{th}$ time $T_N$—that is subsequent to the first time $T_1$. In this way, the false user accounts 132 are continually changing over time—just as a real user account 132 that is actually being used does.

In some embodiments, the false tenant model 110 is designed to populate the false tenant accounts 132 with new false data files 140 in accordance with patterns of activity that are identified within the corpus of text 142. For example, the false tenant model 110 may cause "generated" false email messages to be sent to the false inboxes 134 at a rate that is similar to that which "real" email messages are sent to the real inboxes 124 over the course of a typical business day. Furthermore, such activity may be slowed or halted during off-peak, non-business, and/or holiday hours. Similar, patterns of activity may be identified with respect to the real outboxes 126 and/or real hosted files 128 and may be incorporated into the false tenant model 110. In this way, the frequency at which "sent" email messages are populated into the false outbox 136 may resemble that which the real user(s) actually send messages over the course of a typical business day. Additionally, or alternatively, the frequency at which data files are added to the set of real hosted files 128 may also be similarly modulated.

In some embodiments, the system 100 may implement a phishing activity reporter 118 that is configured to report certain types of phishing activity to the real tenants 120. For example, the phishing activity reporter 118 may monitor interaction data that indicates computing activities that take place between a phisher device and the false user accounts. Then, based on the interaction data, the phishing activity reporter 118 may determine whether a malicious entity appears to be a common "commodity" type phisher that is pursuing sensitive information but has no particular or heightened interest in obtaining sensitive data specifically from a particular tenant. For example, the interaction data may correspond to the malicious entity logging onto a false user account 132 that appears to the malicious entity to be owned by steve@enterprisedomain.com. Once logged on, the malicious entity may download false contact information that is associated with the false user account 132 without browsing through and/or reading various specific documents that are stored in this account. Under these circumstances, the phishing activity reporter 118 may classify the malicious entity as a common "commodity" type phisher and report the phishing activity to one or more real tenants 120.

Alternatively, once logged on, the malicious entity may begin speedily browsing through and/or downloading the various false documents (e.g., fake email messages, fake data files, fake engineering drawings, etc.). It can be appreciated that this type of activity may indicate that the malicious entity has a specific interest in obtaining sensitive details about the particularly targeted business. Under these alternative circumstances, the phishing activity reporter 118 may classify the phisher as an "industrial espionage" type phisher and report the phishing activity to a specifically targeted real tenant 120. In this way, a real business can deploy false user accounts 132 that appear to include information that is valuable to their competitors and, therefore, serve to attract malicious competitors into accessing these accounts. Then, when the real business is actually targeted by such a competitor they can quickly learn of the ongoing threat and take appropriate security measures. It can be appreciated that such accounts may colloquially be referred to as "honeypot" accounts or simply "honeypots."

In some instances, the system 100 enables personnel associated with the individual real tenants 120 to provide tenant defined parameters 108 that prescribe various aspects of how the false data files 140 and/or other content is to be generated for the false user accounts 132. In some implementations, the tenant defined parameters 108 may prescribe that specific words and/or phrases be included and/or omitted from any documents that are generated by the false tenant model 110. As a specific but nonlimiting example, a tenant administrator associated with the real tenant 120 may recognize that due to a major product release being internally code names as "RENO," this word will appear with frequency in the corpus of text 142. Normally, this may trigger the false tenant model 110 to generate documents that also include this word. However, in order to further shield their internal operations and protect this code name from being externally identified by a malicious entity, the tenant defined parameters 108 may restrict this word from being used in any documents that are added to the false user account(s) 132 that are based on that particular real tenant 120.

Additionally, or alternatively, the tenant defined parameters 108 may include file names for specific false data files 140 and/or data files that are generated by the false tenant model 110. For example, suppose that a business is in the process of developing a new version of a product. A tenant administrator may rename fake email messages and/or hosted documents to include a name of this product. In this way, if a malicious entity gains access to the false user account 132 and begins reading and/or downloading files that are intentionally named to indicate their relation to the product, the phishing activity reporter 118 may report this activity to inform the tenant administrator that potential industrial espionage is taking place.

Figure 2:
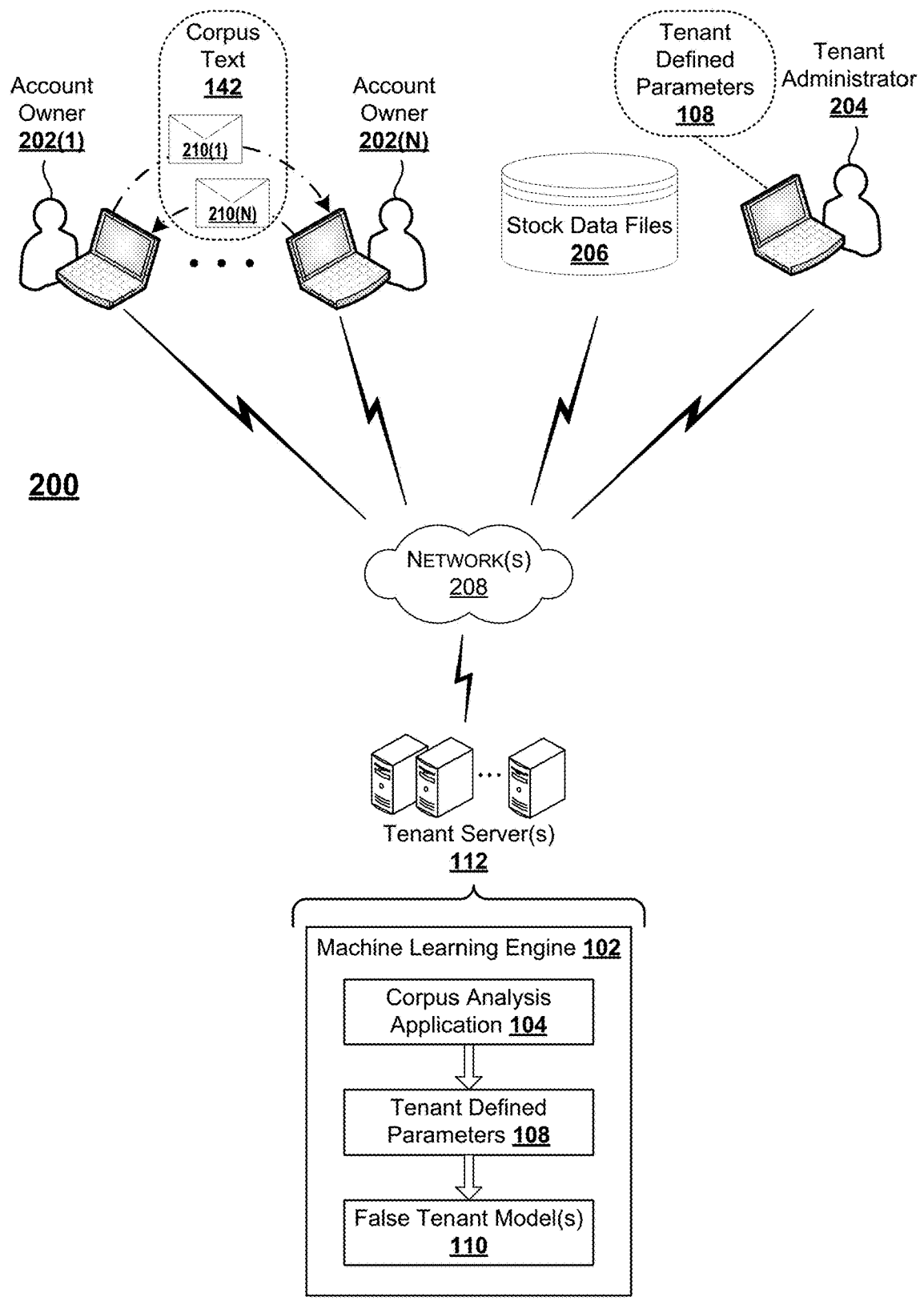
FIG. 2 is a schematic diagram of an illustrative computing environment that is configured to deploy the machine learning engine to analyze a corpus of text to generate a false tenant model.

Turning now to FIG. 2, illustrated is a schematic diagram of an illustrative computing environment 200 that is configured to deploy the machine learning engine 102 to analyze the corpus of text 142 to generate a false tenant model 110. Ultimately, the false tenant model 110 may be utilized by the tenant server(s) 112 to populate false user accounts 132 with false data files 140 as described herein.

In some embodiments, the machine learning engine 102 may generate the false tenant model 110 based on sets of real data files 210 that are stored in association with and/or transmitted between one or more real user accounts 122. For example, as illustrated, a first account owner 202(1) through an $N^{th}$ account owner 202(N) may transmit one or more email messages during the performance of their legitimate business functions. These messages may be transmitted within an organization (e.g., between employees of the organization that subscribes to the real tenant 120) or may be transmitted external to the organization (e.g., from an employee of the organization to a third-party vendor, or vice versa). Thus, it can be appreciated that in some implementations, the corpus of text 142 may be made up of a set of real data files 210 that are stored and/or generated in association with a real tenant 120. Additionally, or alternatively, the corpus of text 142 may be made up of a set of data files (e.g., letters, emails, engineering prints, spreadsheets, tax documents, etc.) that are not specific to a particular real tenant 120. For example, the corpus of text 142 may include a portion of data files that are stock data files 206 that may be used repeatedly to generate false tenant models 110 for a plurality of different real tenants 120.

In some embodiments, the machine learning engine 102 may generate the false tenant model 110 using a "deep learning" type machine learning algorithm that leverages a sequenced arrangement of layers of processing units. In an exemplary implementation, the sequenced arrangement comprises a sequence of multiple layers of nonlinear processing units wherein each successive layer may use an output from a previous layer as an input.

In a specific but nonlimiting example, the corpus analysis application may utilize a recurrent neural network (RNN) that includes multiple layers of Long Short-Term Memory (LSTM) units to analyze the corpus of text and to determine various properties that are exhibited by the set of data files. For example, the corpus analysis application may determine the vocabulary and grammatical structure that is used within the corpus of text. The vocabulary may include a listing of the individual words found in the corpus and their corresponding frequency of use. The grammatical structure may be an underlying structure or theme with which the various individual words of the vocabulary are compiled together in the corpus of text to communicate concepts and/or information. Stated in generalized and simplistic terms, the machine learning engine 102 may utilize an RNN having layers of LSTM units to learn the language that is spoken/written within the corpus of text 142. Additionally, or alternatively, other machine learning techniques may also be utilized, such as unsupervised learning, semi-supervised learning, classification analysis, regression analysis, clustering, etc. One or more predictive models may also be utilized, such as a group method of data handling, Naïve Bayes, k-nearest neighbor algorithm, majority classifier, support vector machines, random forests, boosted trees, Classification and Regression Trees (CART), neural networks, ordinary least square, and so on.

In the illustrated example, the machine learning engine 102 may also utilize tenant defined parameters 108 to generate the false tenant model 110. For example, personnel associated with the individual real tenants 120 may provide tenant defined parameters 108 that prescribe various aspects of how the false data files 140 and/or other content is to be generated for the false user accounts 132. The tenant defined parameters 108 may prescribe that specific words and/or phrases be included and/or omitted from any documents that are generated by the false tenant model 110. As a specific but nonlimiting example, a tenant administrator 204 associated with the real tenant 120 may recognize that due to a major product release being internally code names as "RENO," this word will appear with frequency in the corpus of text 142. Normally, this may trigger the false tenant model 110 to generate documents that also include this word. However, to further shield their internal operations and protect this code name from being externally identified by a malicious entity, the tenant defined parameters 108 may restrict this word from being used in any documents that are added to the false user account(s) 132 that are based on that particular real tenant 120.

Based on the corpus of text 142 and the tenant defined parameters 108 (if any are provided), the machine learning engine 102 generates the false tenant model 110 for dynamically populating a false user account with messages and/or data files. In some implementations, a "dynamic" false user account may be continually populated with fresh documents (e.g., emails, hosted files, etc.) so as to appear practically indistinguishable from real user accounts that are continually populated with new real email messages and/or new real hosted files as they are used by account owners to perform legitimate business activities. The realistic nature of the dynamic false user accounts described herein significantly reduces the ability of malicious entities to identify a user account as being false in nature. Thus, as compared to conventional false user accounts that are static in nature, the dynamic false user accounts described herein are better suited for enticing malicious entities to remain logged in—thereby prolonging the period of time during which the malicious entities' behavior can be observed and the amount of the malicious entities' time that is wasted.

In some implementations, the machine learning engine 102 may continually and/or periodically analyze additional real data files 210 for a particular real tenant 120 to continually and/or periodically update a particular false tenant 130 that specifically corresponds to the particular real tenant 120. In this way, the false data files that are generated to populate the false tenant's 130 false user accounts 132 will closely resemble the real data files 210 that are currently and/or recently being generated in association with the real tenant 120.

Figure 3:
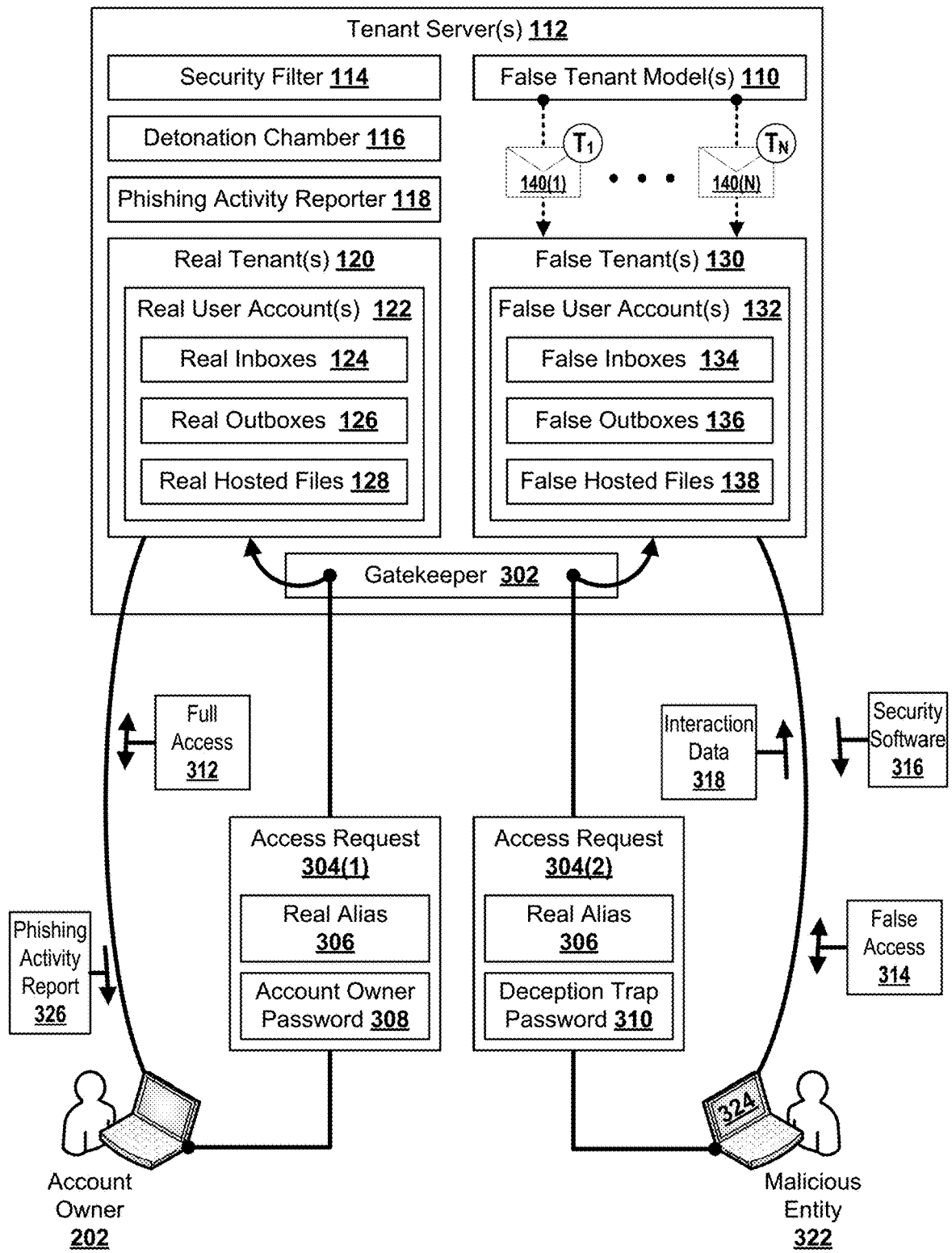
FIG. 3 is a system for routing access requests through a gate keeper to selectively provision access to false user accounts or real user accounts based upon credentials included within the access requests.

Turning now to FIG. 3, illustrated is a system 300 for routing access requests 304 through a gate keeper 302 to selectively provision access to false user accounts 132 or real user accounts 122 based upon credentials included within the access requests 304. For purposes of the present discussion, presume that the tenant server(s) 112 are facilitating a real user account 122 that corresponds to a real user alias 306 and an account owner password 308. The real user alias 306 may be an email address that corresponds to the real user account 122. The account owner password 308 may be an alphanumerical sequence of letters and/or numbers that are provided by the account owner 202 to receive full access 312 to the real user account 122. As a specific example, the real user alias 306 may be the email address of "steve@enterprisedomain.com" and the account owner password 308 may be "12345." Thus, as illustrated, the account owner 202 may generate a first access request 304(1) that includes the real user alias 306 of "steve@enterprisedomain.com" and the account owner password 308 of "12345." Then, by virtue of the first access request 304(1) correctly including the real alias 306 in conjunction with the account owner password 308, the gatekeeper 302 may grant the account owner 202 with the full access 312 to the real user account 122 and/or other computing resources facilitated by the real tenant 120.

In contrast, a second access request 304(2) may include credentials that are associated with the false tenant 130. For example, as illustrated, the second access request 304(2) includes the real user alias 306 in conjunction with a deception trap password 310. The deception trap password 310 may be a specific alphanumerical sequence of letters and/or numbers that cue the gatekeeper 302 to provide false access 314 to deceive a malicious entity 322 into believing that the full access 312 to the real tenant 120 has been granted. For example, the false access 314 may cause a computing device from which the second access request 304(2) was transmitted to render a false inbox 134 and/or false outbox 138 that is populated with false data files 140.

In some implementations, one or more components of the system 300 may monitor interactions that occur between a phisher device and the false user account 132 to harvest additional information about attack strategies and malware that are used by the malicious entities—thereby thwarting future user of such attack strategies and malware. As illustrated, for example, interaction data 318 is being transmitted from the phishing device 324 to the false user account 132. Exemplary interaction data 318 may include information associated with phishing campaigns, malware that is used by the malicious entity 322, and/or specific types of information being targeted by the malicious entity 322. It can be appreciated that while generating the interaction data 318, the malicious entity 322 may be under the belief that the false user account 132 is actually the real user account 122 that corresponds to the real user alias 306 (e.g., the email account of steve@enterprisedomain.com).

As described herein, the false tenant model 110 may be used to generate fake documents, fake emails, and/or fake contacts (e.g., fake email aliases). This generated content can be used to populate the false user account 132 thereby making it appear to be a real user account (i.e. a user account that is actively utilized by a real user for business purposes). In some embodiments, the false access 314 may be designed to give the appearance that emails are being transmitted to and/or from these fake contacts—all while the malicious entity 322 (e.g., phisher) is logged into the false user account 132. For example, the false tenant model 110 may be used to continually populate the inbox and/or outbox with received and/or sent mail over the course of time. In this way, as the malicious entity 322 is logged into the false user account 132, the impression is given that some real user is also simultaneously logged in and is currently using the account to send and/or receive emails—although it can be appreciated that no such real user actually exists. Email messages that are "sent" by the malicious entity 322 from the false user account 132 may in some embodiments show up in the outbox. Furthermore, in some implementations, emails that are "sent" by the malicious entity 322 may be transmitted to a response engine to trigger false responses and/or seed responses as described below.

In some embodiments, the system 300 may implement a phishing activity reporter 118 that is configured to report certain types of phishing activity to the real tenants 120. For example, the phishing activity reporter 118 may monitor interaction data that takes place between a phisher device and the false user accounts. Then, based on the interaction data, the phishing activity reporter 118 may determine whether a malicious entity appears to be a common "commodity" type phisher that is pursuing sensitive information but has no particular or heightened interest in obtaining sensitive data specifically from a particular tenant. For example, once logged on, the malicious entity may download false contact information that is associated with the false user account 132 without browsing through and/or reading various specific documents that are stored in this account. Under these circumstances, the phishing activity reporter 118 may classify the malicious entity as a common "commodity" type phisher and report the phishing activity to one or more real tenants 120. Alternatively, once logged on, the malicious entity may begin speedily browsing through and/or downloading the various false documents (e.g., fake email messages, fake data files, fake engineering drawings, etc.). It can be appreciated that this type of activity may indicate that the malicious entity has a specific interest in obtaining sensitive details about the particularly targeted business. Under these alternative circumstances, the phishing activity reporter 118 may classify the phisher as an "industrial espionage" type phisher and report the phishing activity to a specifically targeted real tenant 120.

In this way, a real business can deploy false user accounts 132 that appear to include information that is valuable to their competitors and, therefore, serve to attract malicious competitors into accessing these accounts. Then, when the real business is actually targeted by such a competitor they can quickly learn of the ongoing threat and take appropriate security measures. It can be appreciated that such accounts may colloquially be referred to as "honeypot" accounts or simply "honeypots." Based on the analysis of the interaction data 318, the phishing activity reporter 118 may generate a phishing activity report 326 and send it to the account owner 202 and/or a tenant administrator 204 associated with the real tenant 120.

In some embodiments, the tenant server(s) 112 may respond to the second access request 304(2) and/or specific activities that are performed by the malicious entity 322 while logged into the false user account 132 by transmitting a security software 316 to the phisher computing device 324. The security software 316 may be configured to monitor computing activities that the malicious entity 322 performs on the phisher device 324. Additionally, or alternatively, the security software 316 may be configured to monitor one or more identifying features (e.g., screen size, driver configurations, etc.) of the phisher device 324. Implementations of such techniques may be implemented by and/or in cooperation with law enforcement agencies.

As a specific example, the false user account 132 may be populated with one or more false data files 140 that are specifically named by the account owner 202 and/or the tenant administrator 204 to give the impression of being highly proprietary information. For example, if an organization is in the process of developing a highly proprietary new version of a popular smartphone, one or more false data files 140 may be populated into the false user account 132 and named in a fashion to appear to contain secret details associated with the highly proprietary new version of a popular smartphone. Then, if the malicious entity 322 logs into the false user account 132 using the deception trap password 310, and then attempts to download a false data file that appears to contain proprietary information, the security software 316 may be transmitted to the phisher device 324 to monitor certain identifying features (e.g., screen size, driver configurations, etc.). It can be appreciated that because there is no legitimate purpose for an entity to attempt to access and download the false user accounts 132, it can be presumed with a high degree of confidence that any entity which logs into the false user account by providing the real user alias 306 in conjunction with the deception trap password 310 is a malicious entity 322. Thus, in many jurisdictions it may be feasible for law enforcement agencies and/or judicial agencies to condone (e.g., issue a warrant for) transmitting the security software 316 to fingerprint and/or monitor the phisher device 324.

Figure 4:
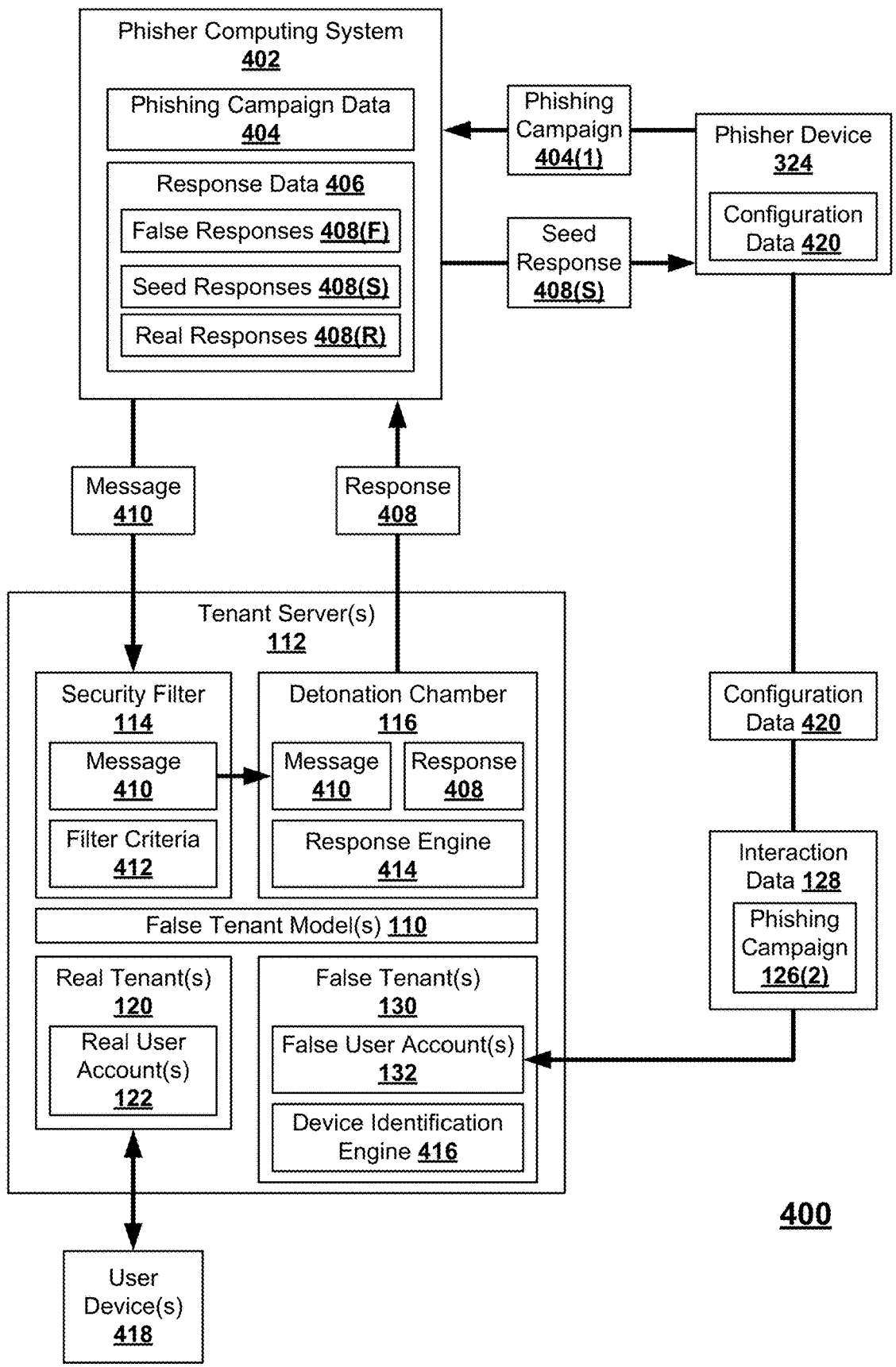
FIG. 4 illustrates a system for identifying messages that are designed to fraudulently obtain sensitive information (e.g., phishing messages) and generating fake sensitive information to pollute response data that is associated with a phishing campaign.

Turning now to FIG. 4, illustrated is a system 400 for identifying messages 410 that are designed to fraudulently obtain sensitive information (e.g., phishing messages) and then generating fake sensitive information to pollute response data 406 that is associated with a phishing campaign 404. Exemplary fake sensitive information may include, but is not limited to, dummy banking information (i.e., information that appears to be but is not actually associated with a valid bank account) and/or dummy email account credentials (i.e., information that appears to be but is not actually associated with a valid email account). In this way, even if a phisher (e.g., a person or entity that is implementing a phishing campaign 404) does obtain some real sensitive information (e.g., real bank account information and/or real email account information) from users that are unsuspectingly deceived by the messages 410, the phisher will have difficulty in confidently identifying and exploiting this real sensitive information since it will be essentially buried within the fake sensitive information. Thus, among other benefits, the technologies described herein provide a significant barrier to successfully exploiting any fraudulently obtained real sensitive information.

As illustrated, a security filter 114 may analyze messages 410 to filter out phishing messages that are designed to fraudulently persuade ("deceive") account owners 202 into providing various types of sensitive information. For example, as illustrated, a message 410 is transmitted from a phisher computer system 402 to the tenant servers 112 where it is received by the security filter 114. The message 410 may correspond to a first phishing campaign 404(1) that a phishing entity generates on a phisher device 324 and uploads to the phisher computing system 402 for implementation. The phisher computing system 402 may include one or more server computers that are leveraged to implement one or more phishing campaigns 404.

Upon receipt of the message 410, the tenant servers 112 may deploy the security filter 114 to analyze the message 410 with respect to the filter criteria 412. The filter criteria 412 may include, for example, a blacklist of known malicious phishing websites so that any message that contains a link to a blacklisted website will be designated as a phishing message, a white list of known trusted websites so that any message that contains a link to a non-whitelisted website will be designated as a phishing message, or other criteria that is indicative of a particular message being designed for phishing purposes. Based on the analysis of individual messages 410 with respect to the filter criteria 412, the security filter 114 may determine which messages are allowed to pass through to the real user account(s) 122 for access by the users via the user device(s) 418. In the illustrated example, the message 410 that is transmitted from the phisher computing system 402 is analyzed by the security filter 114 with respect to the filter criteria 412 and, ultimately, is designated by the security filter 114 as a phishing message.

In order to safely handle fishing messages, the tenant servers 112 may implement a detonation chamber 116 that is designed to facilitate manipulation of various aspects of individual messages 410 in a protected environment. For example, the detonation chamber 116 may be an isolated computing environment such as, for example, a container and/or light weight virtual machine that isolates the real tenants 120 and real user accounts 122 thereof from any computing activity that occurs within the detonation chamber 116. In the illustrated example, the message 410 is designated by the security filter 114 as a phishing message and, as a result, is transmitted into the detonation chamber 116. The detonation chamber 116 isolates the message 410 and any malicious contents thereof from other components of the tenant servers 112.

In some implementations, links that are contained within the message 410 that the security filter 114 transmits into the detonation chamber 116 may be detonated (e.g., activated and/or selected) within the detonation chamber 116 to safely observe and/or analyze the resulting effects. As a specific but nonlimiting example, the message 410 may contain a link that directs a web browsing application to a phishing website that is designed to fraudulently obtain sensitive information from unsuspecting users. In many instances such phishing websites are specifically designed to aesthetically mimic a website of a legitimate organization and may even be hosted at a website address that closely resembles that of the legitimate organization's website. For example, the message 410 may indicate that the user's bank account has experienced a security breach and that the specific user action of visiting a linked website for the purpose of resetting a password is required to prevent the bank account from being frozen.

Upon activating the link(s) that is contained within the message 410, a web browser may open the linked website which may include various form fields that the users instructed to enter specific types of sensitive information into. For example, users may be prompted to enter a username and password associated with an online banking account.

The tenant servers 112 may further utilize a response engine 414 to generate a response 408 to the message 410 in order to pollute response data 406 on the phisher computing system 402. The response engine 414 may analyze the message 410 to identify one or more types of sensitive information that the message 410 is designed to fraudulently obtain from unsuspecting users. For example, continuing with the example in which the message 410 indicates that the user's bank account has been compromised and contains a link to a website that prompts users to enter their associated username and/or password, the response engine 414 may analyze the linked website to identify that users are being prompted to enter a username into a first form field and a password into a second form field.

Upon identifying the type(s) of information being sought, the response engine 414 may generate content that includes fake sensitive information of those type(s). For example, the response engine 414 may generate fake usernames and/or fake passwords. Ultimately, response engine 414 may cause a response 408 that contains generated content to be transmitted to the phisher computing system 402.

In some implementations, the response engine 414 may generate false responses 408(F) which include false sensitive information that is completely unusable. For example, a false response 408(F) may include one or both of a false username and/or false password that are generated by the response engine 414 and are unusable in the sense that the false username and/or false password do not provide access to any real user account 122 or any false user account 132 as described below. As another example, a false response 408(F) may include false credit card number that is unusable in the sense that it does not actually correspond to any credit card account.

In some implementations, the response engine 414 may be configured to generate false sensitive information that on its face passes one or more authenticity criteria. As a specific but nonlimiting example, under circumstances in which the response engine 414 determines that the message 410 is fraudulently seeking credit card numbers, the response engine may generate and transmit false credit card numbers which satisfy the Luhn algorithm that is commonly used to verify the authenticity of credit card numbers. In this way, it will be impractical for the phisher to sift through the responses and separate the fake sensitive information from any real sensitive information that is also obtained.

By generating and transmitting false responses 408(F) that are responsive to the message 410 but that merely include false sensitive information of the type being sought within the message 410, the system 100 may create substantial barriers to phishers being able to exploit even real responses 408(R) (i.e., responses that are generated by real users and that contain real sensitive information)—if any exist within the response data 406. For example, consider a scenario in which implementation of the phishing campaign 404(1) results in one million emails being sent out to different user aliases. Suppose that of the one million emails that are sent, some fraction of these emails successfully reaches users' inboxes (e.g., passes through the security filter 114) and dupes these users into providing real sensitive information. Typically, a phisher that receives these responses would have a very high degree of confidence that the information provided is actual real sensitive information that is readily exploitable (e.g., for financial gain and/or other purposes).

By transmitting some amount of false responses 408(F), the techniques described herein serve to pollute the response data 406 by diluting any real responses 408(F) with some amount of false responses 408(F). For example, suppose that the response data 406 includes a mere fifteen real responses 408(R). Typically, even though the phishing campaign 404(1) may have a relatively low success rate (e.g., 15 parts per million) the resulting successes are readily identifiable and exploitable to any malicious entity having access to the response data 406. However, if the response data 406 further includes some amount of false responses 408(F), then the resulting successes will be hidden or buried within the noise generated by the false responses 408(F). This makes identification and exploitation of the real sensitive data difficult and in some cases impractical. Building off the specific but nonlimiting example from above, if in addition to the fifteen real responses 408(R) the response data 406 also includes fifteen-hundred false responses 408(F), then a phisher will be forced to spend a substantial amount of time and resources sifting through the false responses 408(F). Furthermore, the phisher will have no effective means to readily identify whether any particular piece of sensitive information is real or fake.

In some implementations, the response engine 414 may generate seed responses 408(S) which include information that appears to be of the type being sought within the message 410 but which actually leads to one or more false user accounts 132. As a specific but nonlimiting example, under circumstances in which the message 410 seeks to obtain credentials that are usable to access a real user account 122, the response engine 414 may generate a seed response 408(S) that includes one or more credentials that are usable to access a false user account 132 that is being hosted by a false tenant 130. An exemplary seed response 408(S) may include the deception trap password 310. As illustrated, the phisher device 324 may be used to obtain the seed response 408(S) from the response data 406. Then, the phisher device 324 may be used to access the false user account 132 by providing the user credentials obtained from the seed response 408(S) to the tenant servers 112.

As described above, the false user account 132 may even be populated with false data files to give the appearance of being a real user account 122. For example, the tenant server 112 may implement one or more false tenant models 110 to generate false data files (e.g., data files that contain made-up or fanciful data but that resemble legitimate business files such as user emails and hosted documents). Thus, a malicious actor that logs onto the false user account 132 may be enticed to spend time browsing through the false data files.

In some implementations, the response engine 414 may be designed to cause transmission of false responses 408(F) and/or seed responses 408(S) at a rate that is sufficiently high to disrupt operation of the phisher computing system 402. For example, the response engine 414 may conduct a Denial of Service (DoS) attack and/or a Distributed Denial of Service (DDoS) attack by repeatedly activating the link within the message 410 and/or repeatedly transmitting responses 408 to the phisher computing system 402. In this way, the techniques described herein may be usable to both pollute the response data 406 with false responses 408(F) and/or seed responses 408(S) and also to prevent unsuspecting users from even being able to provide real sensitive information. For example, even if a phishing message associated with the phishing campaign 404(1) actually makes it through to a particular user's inbox and this particular user actually clicks the link with the intention of providing the requested information (e.g., the real sensitive information), the web server(s) that is hosting phishing website will be experiencing so many requests and/or responses from the response engine 414 that it will be unable to serve the particular user's request.

The tenant server(s) 112 may include a device identification engine 416 to determine configuration data 420 that corresponds to the phisher device 324 when that phisher device 324 is used to log into the false user account 132. Exemplary configuration data 420 may include, but is not limited to, a screen size of the phisher device 324, a resolution of the phisher device 324, browser configurations on the phisher device 324, one or more plug-ins that are being operated by the phisher device 324, what browser is being used on the phisher device 324, an Internet protocol (IP) address associated with the phisher device 324, and/or any other information that is discernible about the phisher device 324. This configuration data 420 may provide the device identification engine 416 with the ability to identify one or more other login attempts that originate from the phisher device 324.

Stated plainly, the configuration data 420 serves as a "fingerprint" for the phisher device 324. For example, due to the extremely high number of possible combinations of browser settings and plug-ins that can exist on any particular personal computing device (e.g., a laptop computer, etc.), it may be exceedingly improbable that more than one computing device at any particular IP address will have a specific combination of browser settings and plug-ins. This may hold true even if the particular IP address supports a substantially large number of computing devices such as, for example, in the case of IP addresses that are assigned to universities and other large organizations.

Since the false user account 132 is not actually assigned to any human user for legitimate purposes, it can be assumed with a high degree of confidence that the phisher device 324 that has logged into the false user account 132 is being used by a malicious entity for illegitimate and malicious purposes. Accordingly, the system 100 may utilize the configuration data 420 to "fingerprint" the phisher device 324 and identify when it is subsequently used to attempt to log into one or more real user accounts 122. In some implementations, the tenant servers 112 may deny such attempts to log into real user accounts 122 from devices that are identified as having previously been used to log into one or more false user accounts 132—even if the user credentials provided from the phisher device 324 are completely accurate. In this way, even if a particular user is duped by a phishing email and provides the phisher with their real user credentials, the phisher will still be denied access to the particular user's real user account 122—so long as the phisher attempts to access the account from a "fingerprinted" computing device.

Additionally, or alternatively, the tenant servers 112 may initiate enhanced security protocols in association with a real user account 122 in response to determining that the "fingerprinted" phisher device 324 is currently being used in an attempt to log into the real user account 122. For example, suppose that information has been provided in association with the real user account 122 that is sufficient to require multi-factor authentication for logging in. For example, the user for the account has provided both a password and also a cell phone number via which receive text message codes that are to be provided as an additional factor (i.e., in addition to the password) in order to log into the particular real user account 122. Under these specific but nonlimiting circumstances, an attempt to log into the real user account 122 from a device that resembles the phisher device 324 (e.g., has configuration data 420 that matches that of the phisher device 324 to a certain degree) may trigger heightened security requirements of multifactor authentication.

Additionally, or alternatively, the tenant servers 112 may initiate enhanced security protocols for one or more real user accounts 122 in response to determining that the "fingerprinted" phisher device 324 has at some previous time been used to log into the real user accounts 122. For example, suppose that the phisher device 324 has already been used to log into a real user account 122 and then is subsequently used to log into the false user account 132—for which the credentials are provided in the seed response 408(S). Under these circumstances, one or more tenant administrators for the real tenants 120 may be notified that the real user account 122 has ostensibly been compromised and/or a password reset procedure may be required in association with the particular real user account 122.

Figure 5:
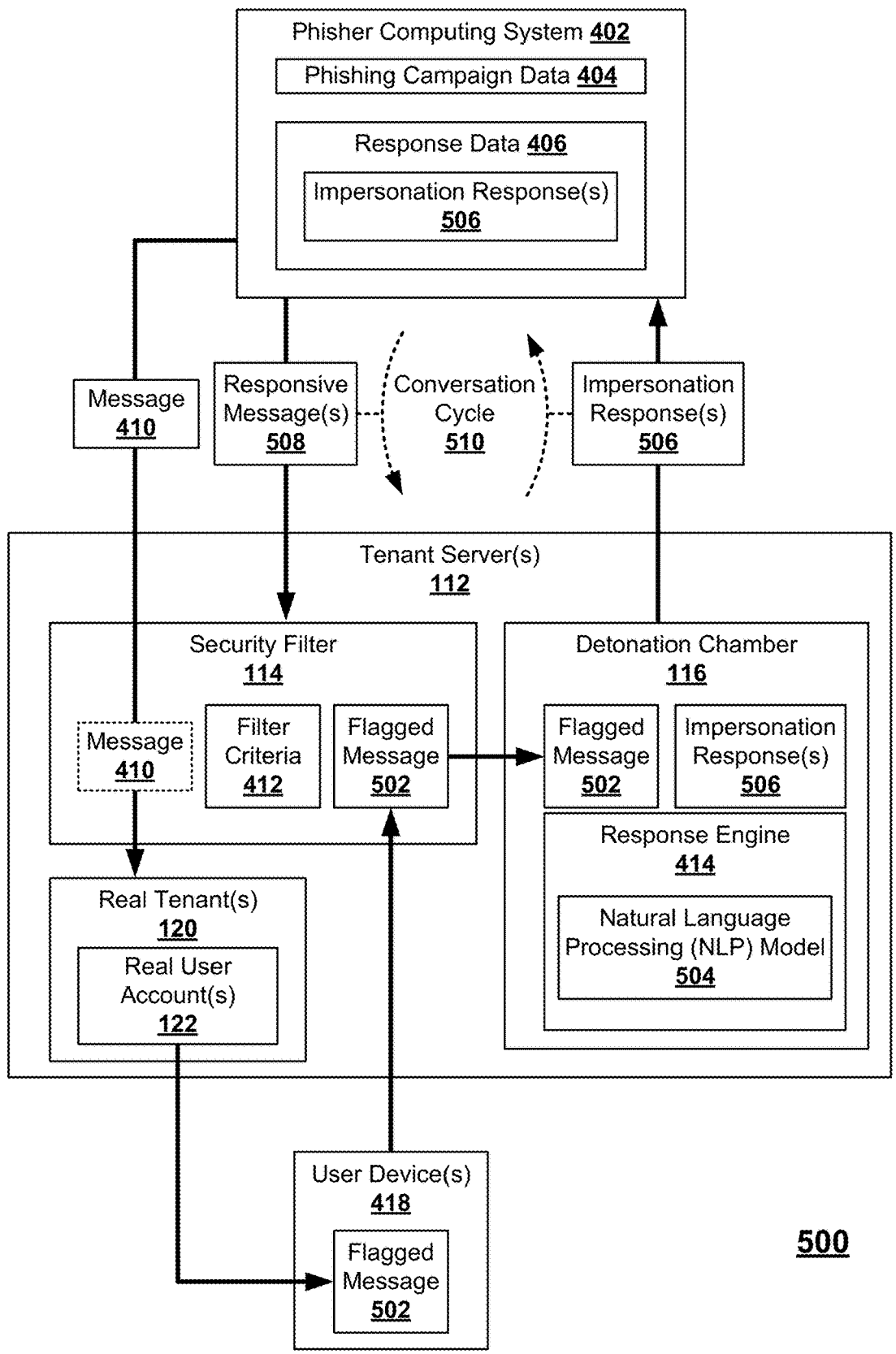
FIG. 5 illustrates a system for enabling a real user to designate a message as a phishing attempt to deploy artificial intelligence (AI) techniques to generate an impersonation response lures a phisher into a conversation cycle.

Turning now to FIG. 5, illustrated is a system 500 for enabling a real user to designate a message 410 as a phishing attempt in order to deploy artificial intelligence (AI) techniques to generate an impersonation response 506 which lures a phisher associated with the message 410 into a conversation cycle 510. As illustrated, the message 410 originates at the phisher computing system 402 in association with a phishing campaign—as described above in relation to FIG. 4. However, for purposes of the FIG. 5, the filter criteria 412 do not cause the security filter 114 to identify the message 410 as being a phishing message. For example, the message 410 may originate in association with a "novel" phishing campaign 404 that has not previously been identified and used to update the filter criteria 412. As illustrated in FIG. 5, the security filter 114 allows the message 410 to pass through to the real tenant 120 and into one or more real user accounts 122. For example, the message 410 may pass to an email inbox of a real user account 122 and, therefore, may be accessible by a real user via the user device 418.

Upon review of the message 410, the real user may recognize the nature of the message 410 and designate the message as a phishing attempt. That is, the real user may mark the message 410 as a flagged message 502 that is flagged ("designated") as a phishing email. The flagged message 502 may be transmitted to the security filter 114 which may analyze the flagged message 502 to update the filter criteria 412. As a specific but nonlimiting example, the security filter 114 may identify one or more user interface (UI) input controls of the flagged message 502 and update the filter criteria 412 for identifying similar or identical UI input controls in future messages 410 that are received via the tenant server(s) 112. Exemplary such UI input controls include, but are not limited to, links to websites, form fields, particular phrases and/or patterns of phrases, and so on. As illustrated, the flagged message 502 may also be passed into the detonation chamber 116 to facilitate securely interacting with and/or responding to the flagged message 502 using the response engine 414. For example, one or more links that are included within the flagged message 502 may be activated within the detonation chamber 116 to safely observe the resulting effects.

The flagged message 502 may be analyzed by the response engine 414 to generate a response to the flagged message 502. In the illustrated embodiment, the response that is generated by the response engine 414 is an impersonation response 506 that is transmitted to the phisher computing system 402 with data indicating that the impersonation response originated (e.g., was drafted in and/or transmitted from) from the particular real user account 122 to which the message 410 was addressed. For example, if the message 410 is specifically addressed to steve@enterprisedomain.com, then the impersonation response 506 may include data that is designed to forge a portion of header data included within the impersonation response 506 so that the appears to have originated from the real user account 122 of steve@enterprisedomain.com—despite having actually originated from within the detonation chamber 116. Stated plainly, an impersonation response 506 is a response that is designed to "spoof" the particular user account to which the message 410 was addressed.

In various implementations, the response engine 414 may analyze the flagged message 502 to identify one or more types of sensitive information that are being pursued. As a specific but nonlimiting example, the flagged message 502 may be an email message that appears to originate from the user's cellular phone service provider. The flagged message 502 may indicate that the user's account is past due, and that service will be terminated unless a payment is submitted immediately. The flagged message 502 may further indicate that payment can be submitted via a cashier's check or a credit card by replying the email with that information. Under these specific circumstances, the response engine 414 may analyze the flagged message 502 to determine that the phishing campaign is pursuing credit card information. Then, the response engine 414 may generate (or otherwise obtain) false credit card information to include within the impersonation response 506.

In various implementations, the response engine 414 may leverage one or more artificial intelligence (AI) techniques to generate a response to the flagged message 502 that closely resembles how a human might actually respond to such a message. In the illustrated embodiment, the response engine 414 includes a natural language processing (NLP) model 504 that is usable to generate responses to messages in a manner that is consistent with how two humans might typically interact and/or converse with one another. For example, the response engine 414 may generate a response to the flagged message 502 that is apologetic for becoming past due on the cellular phone account and asking whether the company will accept a particular type of credit card. Then, the response that is generated may be transmitted to the phisher computer system 402 response as the impersonation response 506. In this example, the response engine 414 has generated an impersonation response 506 that indicates a willingness to comply with the phishing message scam, but which does not actually include the sensitive information that is being pursued.

In various implementations, the response engine 414 may be specifically designed to generate such responses when feasible in order to lure the phisher into replying to the impersonation response 506 with a responsive message 208. In this way, the response engine 414 may be initiate a conversation cycle 510 with the phisher in which a series of additional impersonation responses 506 and responsive messages 508 are transmitted between the phisher and the response engine 414—thereby consuming the phisher's time and resources.

In some implementations, the impersonation responses 506 may be tagged with data that instructs or otherwise causes the tenant servers 112 to prevent the responsive messages 508 from being sent to the real user account 122. In this way, once the impersonation response 506 is sent by the response engine 414, any resulting messages from the phisher that are addressed to the user will not end up in the user's real email inbox. Thus, once a user flags the message 410 as being a phishing attempt, the system 500 will initiate the conversation cycle 510 to waste the phisher's time without consuming any additional amount of the real user's time.

In some implementations, the response engine 414 may be designed to induce a conversation cycle 510 in which the phisher is lured into divulging additional details of one or more other phishing campaigns 404. As a specific but nonlimiting example, the response engine 414 may generate an impersonation response 506 that provides information for a false credit card that has a recently lapsed expiration date. The false credit card information may be designed to cause actual credit card charging systems to indicate that the card has expired. Thus, if the phisher attempts to use the false credit card information to make an online purchase (as phishers often do anonymously online with real credit card information), they will receive a message that payment cannot be processed because the credit card provided has expired. This may induce the phisher into sending a responsive message 208 that indicates that payment has failed and that requests alternate credit card information. Then, the response engine 414 may generate another impersonation response 506 that indicates that the credit card provided was the only credit card owned and that the user was unaware that it had expired.

The message generated by the response engine 414 may further inquire as to whether any alternate forms of online payment can be accepted. This impersonation response 506 may then induce the phisher into providing instructions on how to remit payment to a particular online payment account that the phisher also uses to conduct another phishing campaign 404.

In some embodiments, the additional details of the phishing campaigns 404 that are identified by inducing the conversation cycle 510 may be used to update the filter criteria 412. For example, when the phisher is induced into providing details associated with the particular online payment account, the filter criteria 412 may be updated to reflect this information. Once the filter criteria 412 are updated, then any emails received at the tenant server 112 in the future which contain details regarding this particular online payment account may be recognized by the security filter 114 as being associated with a phishing campaign 404.

Although these techniques are predominantly discussed in the context of the impersonation response 506 spoofing a real user account 122, it is contemplated that such techniques may also be deployed to spoof false user accounts 132 (not shown in FIG. 5) to which a message 410 is addressed. For example, as described above, a phishing entity may send out emails in association with a phishing campaign and may receive back a seed response 408(S) that includes false sensitive information. This false sensitive information may include false email aliases (e.g., email addresses). Then, the phishing entity may send out phishing emails to this false email address. Upon receipt of phishing emails that are addressed to the false email address, the response engine 414 may generate an impersonation response 506 that spoofs the false email address.

Although these techniques are predominantly discussed in the context of the impersonation response(s) 206 and/or conversation cycle 510 occurring as a result of the message 410 being manually flagged by the user of the real user account 122 as phishing, it is contemplated that such techniques may also occur as a result of the message 410 being flagged as phishing by the security filter 114 based on the filter criteria. For example, the impersonation response(s) 206 and/or conversation cycle 510 described in relation to FIG. 2 may occur even with respect to messages that do not pass through the security filter 114 to the real user account 122.

Figure 6:
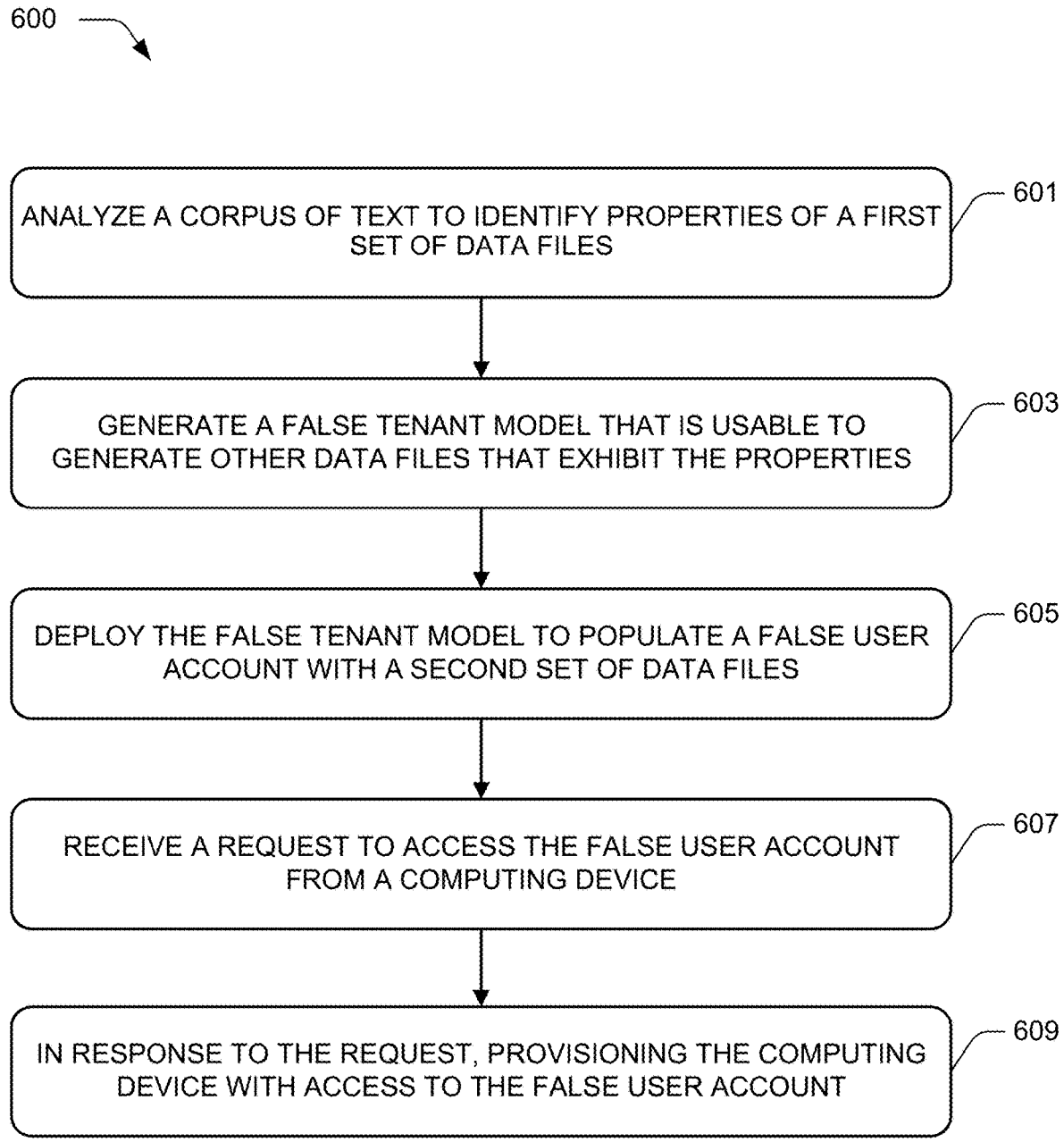
FIG. 6 is a flow diagram of an exemplary process to provision access to a false user account that is populated with fake data files that are generated based on a false tenant model.

FIG. 6 is a flow diagram of an illustrative process 600 which is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 6, illustrated is a flow diagram of an exemplary process 600 to provision access to a false user account that is populated with fake data files that are generated based on a false tenant model.

At block 601, a system may analyze a corpus of text 142 to identify properties of a first set of data files. For example, the system may receive the corpus of text 142 in the form of selections of one or more components of real users accounts 122 such as, for example, real inboxes 124, real outboxes 126, and/or real hosted file locations. The corpus of text 142 may be provided to a corpus analysis application 104 which may utilize various artificial intelligence (AI) techniques to discern the properties of the first set of data files. As a specific example, the corpus analysis application 104 may utilize an RNN that includes a plurality of layers of Long Short-Term Memory (LSTM) units 106 to analyze the corpus of text and determine the various properties. With regard to the properties of the corpus of text 142, the corpus analysis application 104 may determine the vocabulary that is used within the corpus of text 142. The corpus analysis application 104 may further determine the frequency with which various words within the vocabulary are used and/or the context within which the various words within the vocabulary are used.

At block 603, the system may generate a false tenant model 110 that is usable to generate other data files that also exhibit the properties of the first set of data files. For example, if the corpus of text 142 includes a plurality of emails included in one or more real inboxes 124 and/or real outboxes 126, then the false tenant model 110 may be usable to generate other individual emails that exhibit similar properties as was observed in association with the corpus of text 142. However, despite appearing similar to the first set of data files, the files that are generated by the false tenant model 110 are fanciful data files with no real value to a phisher who gains access thereto. For example, the generated files may appear to be genuine email documents despite being generated by a computing system rather than by an actual person.

At block 605, the system may deploy the false tenant model 110 to populate a false user account 132 with a second set of data files. For example, the false user account 132 may be an email account that appears to be a real email account and may even be usable to send and/or receive emails. However, the false user account 132 is not actually assigned to a real user but rather is a "honeypot" type user account that is designed to attract phishers to observe their computing habits, waste their time, and/or extract additional detail regarding new and/or evolving phishing campaigns.

At block 607, the system may receive a request for access to the false user account 132 from a computing device such as, for example, the phisher device 324. The phisher device 324 may be a laptop computer or some other type of personal computing device. The request may include credentials associated with the false user account 132. For example, the credentials may be transmitted in a seed response 408(S) to lure the phisher(s) into accessing the honeypot type false user account 132.

Then, at block 609, the system may respond to the request by provisioning the computing device with access to the second set of data files. In this way, the phisher is enabled to log into the false user account 132 which in turn provides the phisher with the false impression that access has been obtained to a real user account 122 that is being used to conduct actual business. Furthermore, in some embodiments, the false tenant model 110 may be used to periodically generate and add new files into the false user account 132. In this way, the phisher can be logged into the false user account 132 and, in real time, be witnesses emails being sent and/or received to give the impression that a real user is concurrently logged into and even using the false user account 132.

Figure 7:
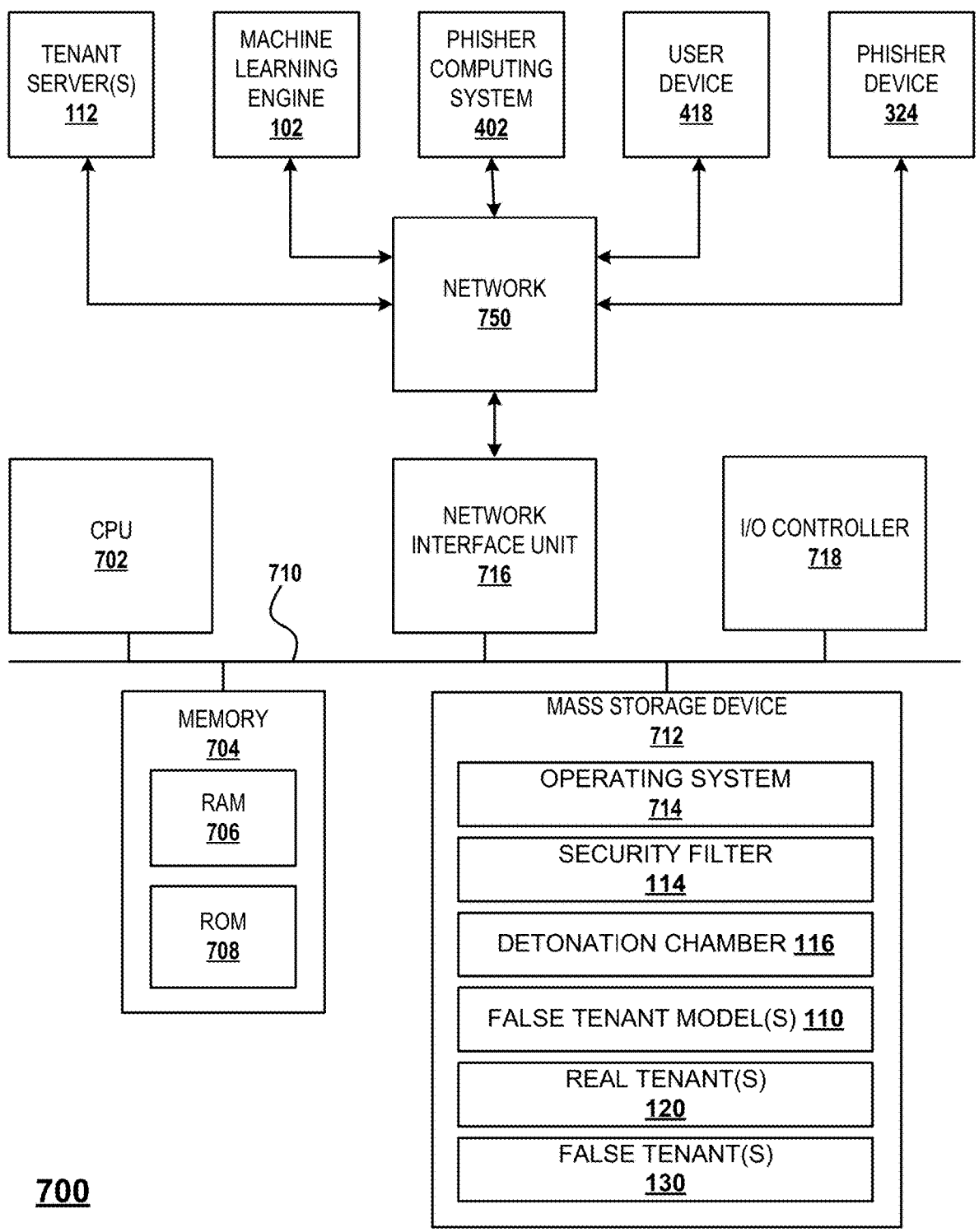
FIG. 7 shows additional details of an example computer architecture for a computer capable of executing the techniques described herein.

FIG. 7 shows additional details of an example computer architecture 700 for a computer capable of executing the techniques described herein. The computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between input controls within the computer architecture 700, such as during startup, is stored in the ROM 708. The computer architecture 700 further includes a mass storage device 712 for storing an operating system 714, other data, and one or more application programs. The mass storage device 712 may further include one or more of the security filter 114, the detonation chamber 116, the false tenant model 110, the real tenants 120), and/or the false tenants 130.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable the tenant servers 112 to communicate with one or more of the machine learning engine 102, the phisher computing system 402, the user device 418, and/or the phisher device 324.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit input controls, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware input controls constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit input controls constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLE CLAUSES

The disclosure presented herein may be considered in view of the following clauses.

Example Clause A, a system, comprising: at least one processor; and at least one memory in communication with the at least one processor, the at least one memory having computer-readable instructions stored thereupon that, when executed by the at least one processor, cause the at least one processor to: cause a false tenant to generate a false user account in association with one or more credentials; obtain a false tenant model that is usable to generate false data files that exhibit properties that have been identified by analyzing a corpus of text; deploy the false tenant model to populate the false user account with the false data files; receive, from a computing device, an access request that includes the one or more credentials; and based on the access request, provision the computing device with access to the false data files that are included within the false user account.

Example Clause B, the system of Example Clause A, wherein obtaining the false tenant model includes causing a machine learning engine to analyze the corpus of text using a sequenced arrangement of processing units to build the false tenant model that is usable to generate the false data files that exhibit the properties.

Example Clause C, the system of Example Clause A, wherein the properties that have been identified by analyzing the corpus of text include at least a vocabulary and a grammatical structure of the corpus of text.

Example Clause D, the system of Example Clause A, wherein the computer-readable instructions further cause the at least one processor to populate the false user account with at least one additional false data file while provisioning the computing device with access to the false user account.

Example Clause E, the system of claim A, wherein the access request includes a real user alias that corresponds to a real user account.

Example Clause F, the system of claim E, wherein provisioning the computing device with access to the false data files is responsive to the access request including a deception trap password in conjunction with the real user alias that corresponds to the real user account, and wherein the deception trap password is different than an account owner password that corresponds to the real user account.

Example Clause G, the system of claim A, wherein the computer-readable instructions further cause the at least one processor to: analyze interaction data that indicates computing activities that occur between the computing device and the false user account; and generate a phishing activity report that indicates aspects of the computing activities.

Example Clause H, the system of claim A, wherein the computer-readable instructions further cause the at least one processor to: analyze the access request to determine whether the one or more credentials include a real user alias, that corresponds to a real user account, in conjunction with an account owner password that corresponds to the real user account; and provision access to the real user account in response to the one or more credentials including the real user alias in conjunction with the account owner password; or provision access to the false user account in response to the one or more credentials including the real user alias and omitting the account owner password.

Example Clause I, a computer-implemented method, comprising: obtaining a corpus of text that includes a set of individual data files that have one or more properties; causing a machine learning engine to analyze the corpus of text to build a false tenant model that is usable to generate individual false data files that have the one or more properties; deploying the false tenant model to generate a set of false data files that have the one or more properties; populating a false user account with the set of false data files that have the one or more properties, wherein the false user account is associated with one or more credentials; and provisioning a computing device with access to the false user account in response to an access request including the one or more credentials.

Example Clause J, the computer-implemented method of Example Clause I, wherein the machine learning engine analyzes the corpus of text using a recurrent neural network (RNN) having a sequenced arrangement of long short-term memory (LSTM) units.

Example Clause K, the computer-implemented method of Example Clause I, wherein the set of individual data files, that is included within the corpus of text, includes individual real data files that are stored in association with a real user account.

Example Clause L, the computer-implemented method of Example Clause I, wherein the provisioning the computing device with access to the false user account is responsive to the one or more credentials: including at least a real user alias associated with a real user account; and omitting an account owner password associated with the real user account.

Example Clause M, the computer-implemented method of Example Clause I, wherein the populating the false user account with the set of false data files includes periodically populating a false inbox with individual false data files in accordance with at least one predetermined pattern of activity.

Example Clause N, the computer-implemented method of Example Clause I, further comprising: analyzing interaction data that indicates computing activities that occur between the computing device and the false user account; and updating filter criteria based on at least in part on aspects of the computing activities.

Example Clause O, the computer-implemented method of Example Clause I, wherein the properties that have been identified by analyzing the corpus of text include at least a grammatical structure of the corpus of text.

Example Clause P, a system, comprising: at least one processor; and at least one memory in communication with the at least one processor, the at least one memory having computer-readable instructions stored thereupon that, when executed by the at least one processor, cause the at least one processor to: obtain a plurality of real data files that correspond to one or more real user accounts; cause a machine learning engine to analyze the plurality of real data files to build a false tenant model that is usable to generate false data files having one or more properties that correspond to the plurality of real data files; deploy the false tenant model to periodically populate a false user account with individual false data files in accordance with at least one predetermined pattern of activity; and provision a computing device with access to the false user account in response to an access request including one or more credentials, wherein the false user account is populated with at least some of the individual false data files while the computing device is accessing the false user account.

Example Clause Q, the system of Example Clause P, wherein at least some credentials for the false user account are transmitted in a seed response that is generated in response to a message that is addressed to at least one of the one or more real user accounts.

Example Clause R, the system of Example Clause P, wherein provisioning the computing device with access to the false user account is responsive to the one or more credentials including a deception trap password in conjunction with a real user alias that corresponds to a particular real user account.

Example Clause S, the system of Example Clause P, wherein the machine learning engine is recurrent neural network (RNN) having a sequenced arrangement of long short-term memory (LSTM) units.

Example Clause T, the system of Example Clause P, wherein the one or more properties include at least a grammatical structure of the plurality of real data files that correspond to one or more real user accounts.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system, comprising:
at least one processor; and
at least one memory in communication with the at least one processor, the at least one memory having computer-readable instructions stored thereupon that, when executed by the at least one processor, cause the at least one processor to:
cause a false tenant to generate a false user account in association with one or more credentials;
obtain a false tenant model that is usable to generate false data files that exhibit properties that have been identified by analyzing a corpus of text;
deploy the false tenant model to populate the false user account with the false data files;
receive, from a computing device, an access request that includes the one or more credentials; and
based on the access request, provision the computing device with access to the false data files that are included within the false user account.

2. The system of claim 1, wherein obtaining the false tenant model includes causing a machine learning engine to analyze the corpus of text using a sequenced arrangement of processing units to build the false tenant model that is usable to generate the false data files that exhibit the properties.

3. The system of claim 1, wherein the properties that have been identified by analyzing the corpus of text include at least a vocabulary and a grammatical structure of the corpus of text.

4. The system of claim 1, wherein the computer-readable instructions further cause the at least one processor to populate the false user account with at least one additional false data file while provisioning the computing device with access to the false user account.

5. The system of claim 1, wherein the access request includes a real user alias that corresponds to a real user account.

6. The system of claim 5, wherein provisioning the computing device with access to the false data files is responsive to the access request including a deception trap password in conjunction with the real user alias that corresponds to the real user account, and wherein the deception trap password is different than an account owner password that corresponds to the real user account.

7. The system of claim 1, wherein the computer-readable instructions further cause the at least one processor to:
analyze interaction data that indicates computing activities that occur between the computing device and the false user account; and
generate a phishing activity report that indicates aspects of the computing activities.

8. The system of claim 1, wherein the computer-readable instructions further cause the at least one processor to:
analyze the access request to determine whether the one or more credentials include a real user alias, that corresponds to a real user account, in conjunction with an account owner password that corresponds to the real user account; and
provision access to the real user account in response to the one or more credentials including the real user alias in conjunction with the account owner password; or
provision access to the false user account in response to the one or more credentials including the real user alias and omitting the account owner password.

9. A computer-implemented method, comprising:
obtaining a corpus of text that includes a set of individual data files that have one or more properties;
causing a machine learning engine to analyze the corpus of text to build a false tenant model that is usable to generate individual false data files that have the one or more properties;
deploying the false tenant model to generate a set of false data files that have the one or more properties;
populating a false user account with the set of false data files that have the one or more properties, wherein the false user account is associated with one or more credentials; and
provisioning a computing device with access to the false user account in response to an access request including the one or more credentials.

10. The computer-implemented method of claim 9, wherein the machine learning engine analyzes the corpus of text using a recurrent neural network (RNN) having a sequenced arrangement of long short-term memory (LSTM) units.

11. The computer-implemented method of claim 9, wherein the set of individual data files, that is included within the corpus of text, includes individual real data files that are stored in association with a real user account.

12. The computer-implemented method of claim 9, wherein the provisioning the computing device with access to the false user account is responsive to the one or more credentials: including at least a real user alias associated with a real user account; and omitting an account owner password associated with the real user account.

13. The computer-implemented method of claim 9, wherein the populating the false user account with the set of false data files includes periodically populating a false inbox with individual false data files in accordance with at least one predetermined pattern of activity.

14. The computer-implemented method of claim 9, further comprising:

analyzing interaction data that indicates computing activities that occur between the computing device and the false user account; and updating filter criteria based on at least in part on aspects of the computing activities.

15. The computer-implemented method of claim 9, wherein the properties that have been identified by analyzing the corpus of text include at least a grammatical structure of the corpus of text.

16. A system, comprising:
 at least one processor; and
 at least one memory in communication with the at least one processor, the at least one memory having computer-readable instructions stored thereupon that, when executed by the at least one processor, cause the at least one processor to:
  obtain a plurality of real data files that correspond to one or more real user accounts;
  cause a machine learning engine to analyze the plurality of real data files to build a false tenant model that is usable to generate false data files having one or more properties that correspond to the plurality of real data files;
  deploy the false tenant model to periodically populate a false user account with individual false data files in accordance with at least one predetermined pattern of activity; and
  provision a computing device with access to the false user account in response to an access request including one or more credentials, wherein the false user account is populated with at least some of the individual false data files while the computing device is accessing the false user account.

17. The system of claim 16, wherein at least some credentials for the false user account are transmitted in a seed response that is generated in response to a message that is addressed to at least one of the one or more real user accounts.

18. The system of claim 16, wherein provisioning the computing device with access to the false user account is responsive to the one or more credentials including a deception trap password in conjunction with a real user alias that corresponds to a particular real user account.

19. The system of claim 16, wherein the machine learning engine is recurrent neural network (RNN) having a sequenced arrangement of long short-term memory (LSTM) units.

20. The system of claim 16, wherein the one or more properties include at least a grammatical structure of the plurality of real data files that correspond to one or more real user accounts.

* * * * *